United States Patent [19]

Sinko

[11] 3,856,246

[45] Dec. 24, 1974

[54] CONDUIT SPACER MODULAR CONSTRUCTION

[75] Inventor: George M. Sinko, Royal Oak, Mich.

[73] Assignee: Underground Products, Inc., Livonia, Mich.

[22] Filed: May 19, 1972

[21] Appl. No.: 255,225

[52] U.S. Cl. .............. 248/68 CB, 138/112, 248/49, 403/294, 403/331
[51] Int. Cl. ............................................... F16l 3/22
[58] Field of Search.... 248/68 R, 68 CB, 49, 74 PB; 61/72.1, 72.2, 72.4; 138/105, 106, 112; 403/294, 331

[56] References Cited
UNITED STATES PATENTS

| 1,617,625 | 2/1927 | Fitzgerald | 248/49 |
| 1,821,234 | 9/1931 | Parker | 248/49 X |
| 3,188,030 | 6/1965 | Fischer | 248/68 CB |
| 3,464,661 | 9/1969 | Alesi | 248/68 CB |
| 3,523,667 | 8/1970 | Guerrero | 248/68 CB X |

FOREIGN PATENTS OR APPLICATIONS

| 1,118,296 | 11/1961 | Germany | 174/156 |
| 221,618 | 8/1962 | Austria | 248/74 PB |
| 540,129 | 4/1957 | Canada | 138/112 |
| 1,058,117 | 5/1959 | Germany | 174/156 |

Primary Examiner—Roy D. Frazier
Assistant Examiner—Rodney H. Bonck
Attorney, Agent, or Firm—Hauke, Gifford, Patalidis & Dumont

[57] ABSTRACT

A conduit spacer and clamp modular system for holding banks of pipes or conduits in a substantially parallel relationship by means of interlocking spacer and clamping module units. Each module unit consists of a frame member having at least one side inwardly recessed to engage a portion of the periphery of a pipe or conduit, and means on the ends of the recessed sides for interlockingly engaging corresponding means disposed on the ends of a similarly recessed side of a second frame member, such that a plurality of superimposed frame members hold a plurality of superimposed pipes or conduits. The frame members are further provided with side interlocking means such that a plurality of vertical rows of pipes or conduits may be interlockingly juxtaposed.

8 Claims, 5 Drawing Figures

CONDUIT SPACER MODULAR CONSTRUCTION

BACKGROUND OF THE INVENTION

The invention relates to a conduit spacer and clamp system for holding a bank or bundle of pipes or conduits in a parallel spaced relationship prior to burying such pipes or conduits in the ground or encasing such pipes or conduits in concrete. The present invention is an improvement upon the pipe or conduit spacer of U.S. Pat. No. 3,523,667.

Electrical power lines and telephone lines, for example, are commonly placed in pipes or conduits buried underground, after being laid in a trench filled with an appropriate filling material. Generally, earth is dumped, or concrete is poured, into the trench so as to solidly encase the pipes or conduits, and afford an appropriate ground level support capable of carrying an important load, especially when the pipes or conduits are buried under a pavement. It is desirable to maintain the pipes or conduits in parallel spaced relationship a predetermined distance from each other by means of a spacing framework with enough space provided between the pipes or conduits and between the spacer members maintaining the pipes or conduits in spaced relationship, so as to enable the filling material, or concrete, to properly fill the spaces between the pipes or conduits without impediment.

The pipes or conduits may be individually laid in a trench with appropriate support and spacing means to maintain the pipes or conduits in an orderly manner in an appropriate parallel spaced relationship or, alternately, a stack or bank of fully assembled pipes or conduit lengths, with appropriate support means and spacer means is assembled above the ground, and the whole assembled bank of aligned pipes or conduits is subsequently lifted off the ground and placed in the trench which is subsequently filled with earth or poured concrete. Alternately, the assembled bank of pipes or conduits may be left on the surface of the ground and covered with earth or poured concrete.

It is therefore desirable that appropriate spacing and supporting means be provided between each horizontal row of pipes or conduits and the underlying ground, and that the spacing and supporting means further provide adequate clamping of each pipe or conduit in an appropriate position in a vertical row as well as in a horizontal row. Furthermore, it is desirable that the spacing, supporting and clamping means employed be of cheap and light construction, require a minimum inventory of parts, be capable of use by relatively unskilled labor and do not present an obstacle to the free flow of filling earth or poured concrete into all the spaces between the horizontally and vertically spaced conduits or pipes.

SUMMARY OF THE INVENTION

The present invention, by way of a simple spacer and clamping modular units provided with appropriate longitudinal and lateral interlocking means, has for its principal object to provide a spacing and clamping framework for buried pipes or conduits. The several objects and advantages of the invention will become apparent to those skilled in the art when the following description of the best mode contemplated for practicing the invention is read in conjunction with the accompanying drawing.

BRIEF DESCRIPTION OF THE DRAWING

In the accompanying drawing, wherein like reference numerals relate to like or equivalent elements.

DETAILED DESCRIPTION OF THE PREFERRED EMBODIMENT

Figure 1:
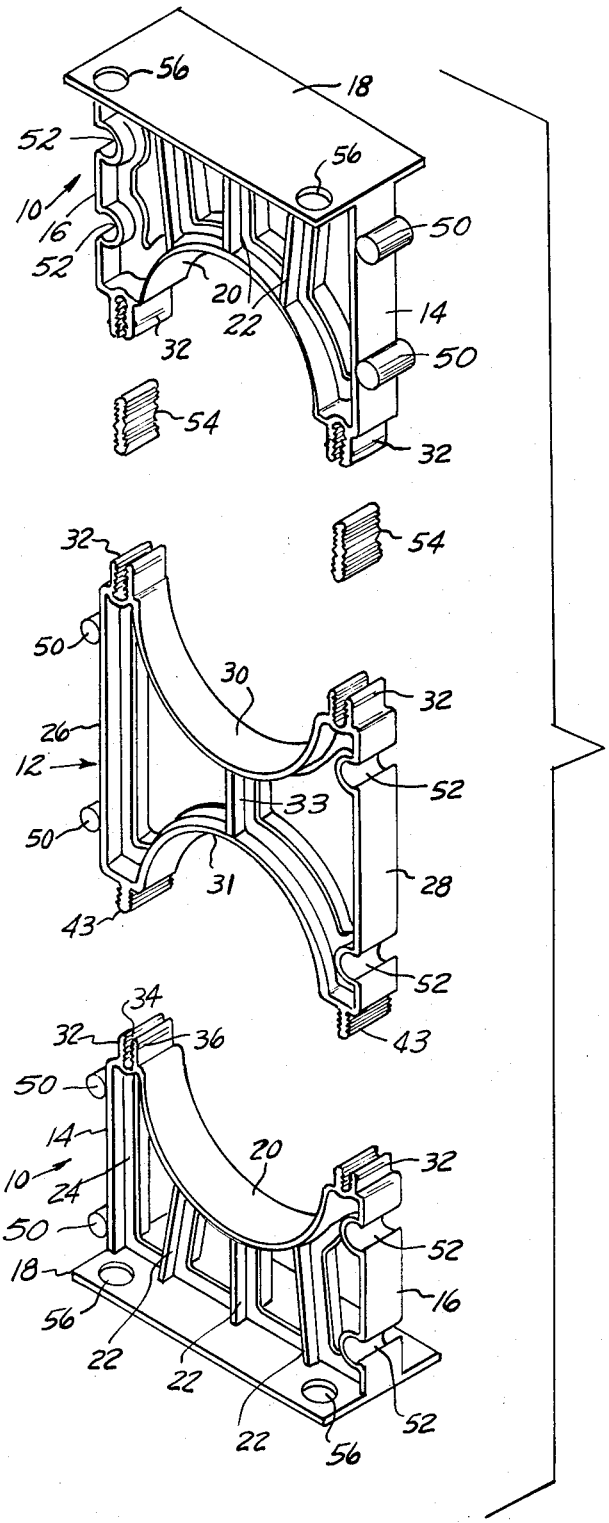
FIG. 1 is a perspective exploded view of the pipe or conduit modular spacer and clamping system of the invention.

Referring now to the drawing and more particularly to FIG. 1 thereof, a pipe or conduit spacer and clamping framework may be built up by means of a plurality of interlocked spacer elements which, according to the invention, consist only of two standard modular units, designated generally by numerals 10 and 12, which may be assembled and interlocked together, as will be explained hereinafter, so as to form appropriate support and clamping means for a plurality of pipes or conduits. The modular units 10 and 12 are advantageously made of a molded plastic material, either a thermoplastic or a thermoset polymer resin, such as, for example, high impact styrene resin, ABS resin (acrylonitile-butadiene-styrene), vinyl, acrylate resin, polypropylene, etc., or they may be made of cast metal such as aluminum or the like.

The modular unit 10 is in the form of a generally rectangular frame member having two substantially parallel sides 14 and 16, and an enlarged side 18 forming a substantially planar base or platform. The side 20 of the modular unit 10, opposite to the planar base 18, is inwardly recessed or curved so as to form a saddle for supporting a pipe or conduit. In the example illustrated, the recessed side 20 is shown arcuately shaped so as to accept, and engage with, the periphery of a circularly cylindrical conduit or pipe. It is obvious that the recessed side 20 may have any appropriate shape to accept pipes or conduits having a cross section other than a circular cross section, such as conduits having a rectangular or a square cross section. A plurality of pillar or post members 22, three in number in the example illustrated, interconnect the recessed side 20 with the planar base 18. The entire frame member 10 may be provided on the interior of each side and on both sides of the pillar or post members 22 with an appropriate reinforcing rib, as shown at 24. The modular unit 10 thus provides a substantially stiff and rigid open frame which can be readily surrounded by earth or poured concrete, and which is substantially rigid while still being of light weight, and requiring a minimum amount of material for molding.

The modular unit 12, or intermediary unit, is molded of the same material and in the same manner as the modular unit 10, that is in the form of an open generally rectangular frame provided with a pair of parallel sides 26 and 28 joined by means of inwardly recessed, symmetrically disposed, opposite sides 30 and 31. For the sake of rigidity and for added support for the superimposed rows, or tiers, of pipes or conduits supported by the intermediary modular unit 12, an integral pillar 33 interconnects the two opposite recessed sides 30 and 31.

Figure 2:
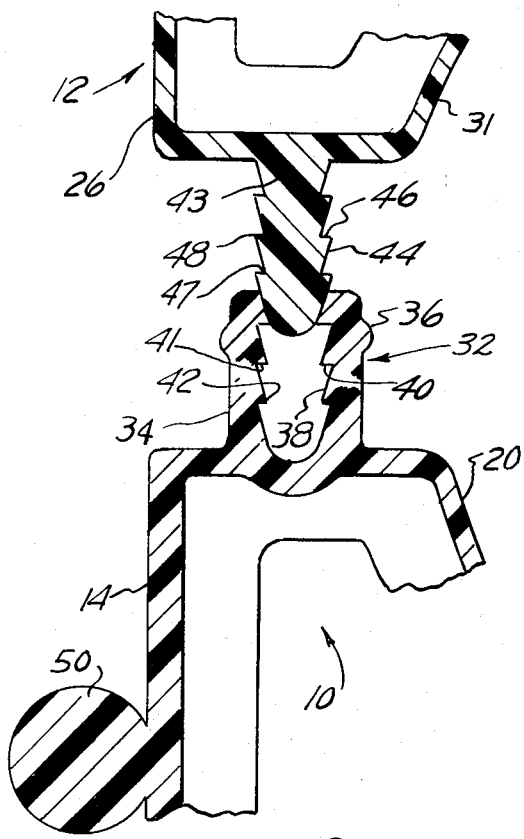
FIG. 2 represents a detailed view of a portion of the invention illustrating the interlocking means between modular units prior to being engaged into each other.
Figure 3:
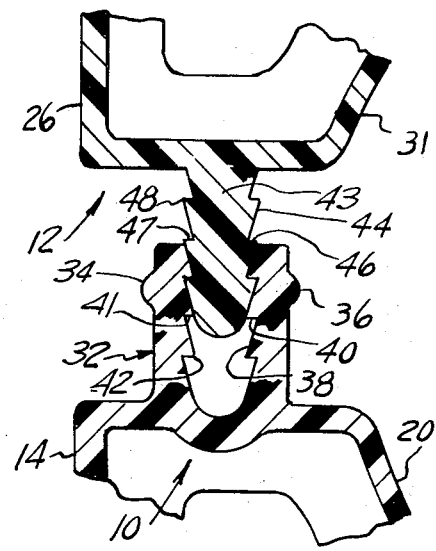
FIG. 3 is a view similar to FIG. 2 but showing the interlocking means partly engaged within each other.
Figure 4:
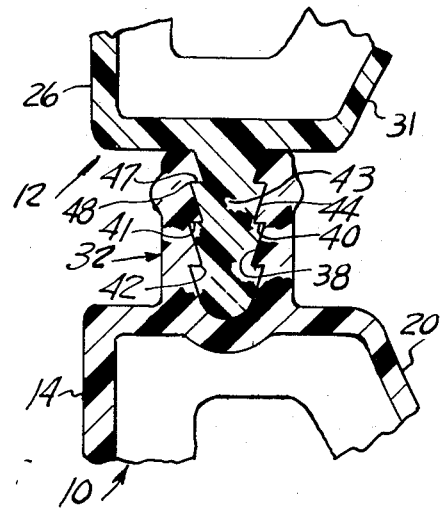
FIG. 4 is a view similar to FIG. 2 but showing the interlocking means fully engaged within each other.

The base modular unit 10 and the intermediary modular unit 12 can be interlocked by way of appropriate interlocking means disposed respectively at the extremities of the recessed sides 20 and 30. In the example illustrated, such interlocking means take the shape of a pair of bifurcated lugs 32, each formed integrally at the extremity of the recessed side 20 of the base modular unit 10, namely at the junction between each end of the recessed side 20 respectively with one of the parallel sides 14 and 16. Each bifurcated lug 32 comprises a pair of substantially parallel wall members 34 and 36 each of which has an inner surface which, as best shown in FIGS. 2-5, is formed with a series of projecting tooth-like integral elements defined by a first surface 38 disposed in a plane at an acute angle to an imaginary longitudinal axis of the lug member 32 intersecting with a second surface 40 disposed substantially at a right angle to such imaginary axis. The intersection of each surface 38 with each surface 40 forms a recessed groove 41 and a sharp projecting edge 42. Each of the corresponding corners of the intermediary frame member 12, at the junctions between its recessed side 31 and each of its lateral sides 26 and 28, is provided with an integrally molded projecting prong 43, in turn provided on its opposite faces with a series of inclined surfaces 44 disposed substantially parallel to the corresponding inclined surfaces 38 on the internal walls of the lug member 34, such inclined surfaces 44 being interconnected by way of step-like surfaces 46 corresponding to the surfaces on the internal walls of the lug 32, the intersections of each surface 44 with a surface 46 forming a sharp recessed groove 47 and a sharp projecting edge 48. It can thus be seen that the shapes of the outer surfaces of the prong 43 and of the internal surface of the wall members 34 and 36 of the lug 32 form complementary one-way interlocking means, generally shaped as a fir tree or Christmas tree, with similar wedging and locking steps and recesses directed in opposite directions, such that due to the wedging action of the ramps provided by the inclined surfaces 44 and 38 respectively, the side wall members 34 and 36 of the lug members 32 are caused to be flexibly spread apart from each other so as to permit the prong 43 to be forcibly introduced between the side wall members 34 and 36 of the lug member 32. The side wall members 34 and 36 snap back substantially to their original position as soon as each sharp edge 42 on the interior walls of the lug member 32 projects into a recessed groove 47 of the prong member 43 and each sharp edge 48 on the prong member projects into the recessed groove 41 on the interior wall of the lug member. When the frame members 10 and 12 are pulled apart, separation of the frame members is prevented as a result of the stepped surfaces 40 and 46 engaging one another. FIG. 2 represents the relative positions of a prong 43 and a lug 32 prior to engagement of the prong 43 within the side wall members of the lug 32. FIG. 3 shows a partially inserted prong 43 into a lug 32, and FIG. 4 represents a fully engaged prong 43 into a lug 32.

The interlocked modular unit frame members 10 and 12 therefore provide a space bordered by the recessed sides 20 and 31 through which a pipe or conduit is disposed. Once interconnected in this manner, the units can not be separated by forces exerted in opposite directions and directed in the plane of the drawing, therefore substantially perpendicular to the axis of the pipe or conduit disposed in the space formed between the inwardly recessed sides 20 and 31 of respectively the frame member 10 and the frame member 12. However, the modular units 10 and 12 may be disconnected by sliding one relatively to the other in opposite directions substantially parallel to the axis of the pipe or conduit.

Turning back to FIG. 1, it can be seen that a plurality of intermediary modular units 12 may be disposed one above the other, and they may be properly interconnected so as to provide superimposed saddle apertures supporting pipes or conduits in vertical rows in a spatial parallel arrangement. The last pipe or conduit may be disposed so as to be supported by the recessed side 30 on the last intermediary frame member 12, if so desired. Because interlocking lateral means are provided in the lateral sides of the modular units 10 and 12 for interconnection with a laterally juxtaposed modular unit, several vertical rows of pipes or conduits may be disposed side by side and interlocked with each other by way of the modular spacer and clamping units of the invention. For the purpose of lateral interconnection between units, each modular unit 10 or 12 is provided on one side thereof, such as side 14 or 26 for example, with a pair of prong members 50 each adapted to slidably engage a corresponding recess 52 formed on the other side 16 or 28 of each modular unit. Such interconnection is effected by sliding one modular unit relative to the other with a prong 50 disposed so as to register with a recess 52 and displacing one modular unit relative to the other in a direction parallel to the axes of the pipes or conduits.

Figure 5:
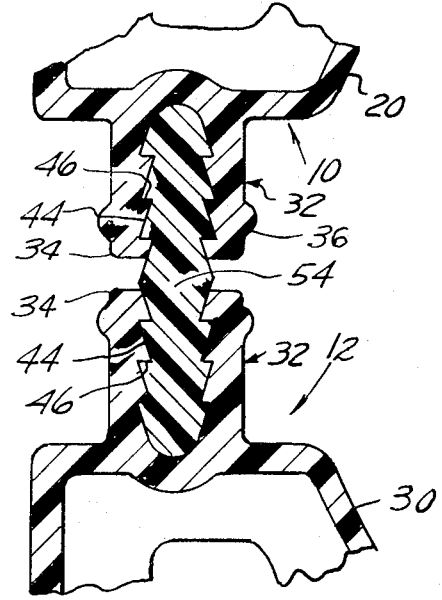
FIG. 5 is a view similar to FIG. 4 but showing a modification of the interlocking means between two modular units.

Each vertical row of pipes or conduits interconnected by means of the spacer and clamping arrangement of the invention may also be capped or topped by means of another modular frame member 10 disposed upside down, as illustrated at FIG. 1. Because, in the structure of the modular frame member 10 illustrated, the interlocking means for connecting a modular frame member 10 with the last or upper intermediary frame member 12 consists also of a pair of the hereinbefore described lug members 32, an adapter prong 54 is provided, of an over-all length sufficient to permit full engagement within the side wall members 34 and 36 of each lug member 32 dependent from the topping frame member 10 and of each lug member 32 dependent from the upper intermediary frame member 12. The adapter prong 54 has opposed faces which, as best seen in FIG. 5, are provided on each end thereof with the one-way wedging and locking means previously described relative to prong members 43, except that the arrangement of the camming and locking surfaces 44 and 46, respectively, at each end of the adapter prong 54 are disposed symmetrically relative to the axis of symmetry of the adapter prong so as to provide an adequate locking engagement with the interior of the side wall members of the lug 32 on the frame member 10, as well as with the interior of the side wall members of the lug member 32 on the intermediary spacer and clamping frame member 12.

A bank or bundle of properly spaced pipes or conduits is built up by first disposing on the ground a plurality of base modular units 10 interconnected side by side and supported on the ground by their base or support side 18. Parallel rows of so interconnected base modular units 10 are disposed at intervals, and a first horizontal row of pipes or conduits is disposed such as to be each supported from the ground on the saddle formed by the recessed side 20 of the base units. A plurality of intermediary modular units 12 are then interconnected, and each row of interconnected intermediary units 12 is clamped onto each row of base units 10 by engaging each of the prongs 43 of the intermediary frame units 12 between the side walls 34 and 36 of each of the lug members 32 of the base frame units 10. A second horizontal row of pipes or conduits is placed so as to each be supported in the saddle formed by the recessed side 30 of the intermediary units 12, and the pipes or conduits are held in position by further rows of interconnected intermediary frame units 12, and so on. Several horizontal rows of pipes or conduits may then be superimposed in proper vertical and lateral spacing and in substantially parallel alignment. Because the prongs 43 may be partially introduced between the side walls 34 and 36 of the lug members 32 and still provide adequate interlocking between the modular units 10 and 12 and between intermediary modular units 12, as represented for example at FIG. 3, slight differences in outer diameters of the pipes or conduits may be accommodated as long as the pipes or conduits do not have an outer diameter larger than the horizontal diameter of the free space provided for the passage of the pipes or conduits between the recessed sides of the interlocked modular frame units. Slightly bent pipes or conduits may also be accommodated.

Each of the pipes or conduits in the upper horizontal row, as previously mentioned, may simply rest on the saddle formed by the recessed side 30 of each upper intermediary modular unit 12 supporting the top row of pipes or conduits, or the whole bank or bundle of spaced pipes or conduits may be capped by a plurality of interconnected base units 10 disposed upside down, as substantially shown in the exploded view of FIG. 1. It is to be noted that the base plate 18 of the base units 10 is preferably provided with apertures, as shown at 56, such that when a bank of properly clamped and spaced pipes or conduits is disposed in a trench, staking rods may be passed through the apertures 56 of the upper and lower base modular units 10, and driven into the ground to maintain the bank of pipes or conduits rigidly in position while, for example, the trench is filled with dirt or with poured concrete.

Although the base units or modular frame members 10 have been shown provided with bifurcated lugs 32 at their two upper corners for interlocking with the projecting prongs 43 disposed at the two corners of one side of the intermediary frame members 12, it is obvious that such an arrangement could be reversed or, alternately, that consecutive corners of the intermediary frame member 12 could be provided one with a lug and the other with a prong, that only lugs could be provided on the corners of the base unit 10, or that an upper capping unit could be provided with prongs so as to do away with providing adapter prongs to interconnect frame members having only bifurcated lugs for interlocking one with the other. On the other hand, both types of frame members, frame member 10 as well as frame member 12, could be provided only with bifurcated lugs, and connector prongs similar to the adapter prong 54 could be exclusively used for vertical interlocking of the diverse frame members. However, the preferred arrangement is that illustrated which reduces considerably the inventory of large elements, as only one type of standard base unit 10 and only one type of standard intermediary unit 12, in different sizes to accommodate different sizes of pipes or conduits, are required, and which provide strong and rigid interconnections between the modular units by way of the integral prong and integral lug interlocking.

Having thus described the invention by way of structural examples of embodiments thereof, what is claimed as new is as follows:

1. A conduit spacer assembly comprising a pair of end frame members each of generally rectangular configuration having a straight side and a side which is recessed inwardly for accepting part of the periphery of a conduit disposed with its axis in a substantially perpendicular relationship to the plane of said frame member, an intermediary substantially similar frame member having two opposite sides recessed inwardly and normally disposed in an adjacent position to the recessed side of each of said frame members such as to surround the remaining of the periphery of the conduit, and locking means on each extremity of said recessed sides comprising an elongated prong member on one of said frame members having a longitudinal axis and engageably projecting within a bifurcated lug member integrally projecting from another of said frame members, said bifurcated lug member formed by a pair of identical flexibly spreadable sidewall members for accepting said prong member, and at least one one-way wedging and locking step formed on a surface of said prong member for interlockingly engaging a corresponding wedging and locking recess on an interior surface of one of said sidewall members of said bifurcated lug member for preventing separation of said frame members in a direction substantially perpendicular to the axis of said conduit and substantially parallel to the plane of said frame members while permitting sliding separation of said frame members in a direction substantially parallel to the axis of said conduit and substantially perpendicular to the plane of said frame members, at least one of said prong members being a separate prong member provided on at least a surface thereof with at least one one-way wedging and locking step for interlockingly engaging said corresponding wedging and locking recess on an interior surface of one of said sidewall members of said bifurcated lug member and on at least another surface thereof with at least a second one-way wedging and locking step for interlockingly engaging the corresponding wedging and locking recess on an interior surface of one of said sidewall members of said bifurcated lug member for interconnecting a pair of said frame members and having said bifurcated lug member on the interconnected sides.

2. The conduit spacer assembly of claim 1 wherein another of said prong members is integral with said frame member.

3. A conduit spacer comprising a frame member of generally rectangular configuration having at least one side which is recessed inwardly for accepting part of the periphery of a conduit disposed with its axis in a substantially perpendicular relationship to the plane of said frame member, locking means on each extremity of said recessed side for engagement with a corresponding locking means on a similar frame member disposed in an adjacent position with the recessed side of said similar frame member disposed surrounding the remaining of the periphery of the conduit, said locking means comprising an elongated prong member on one of said frame members having a longitudinal axis and engageably projecting within a bifurcated lug member integrally projecting from the other of said frame members, said bifurcated lug member formed by a pair of identical flexibly spreadable sidewall members for accepting said prong member, and at least one one-way wedging and locking step formed on a surface of said prong member for interlockingly engaging a corresponding wedging and locking recess on an interior surface of one of said sidewall members of said bifurcated lug member for preventing separation of said frame members in a direction substantially perpendicular to the axis of said conduit and substantially parallel to the plane of said frame members while permitting sliding separation of said frame members in a direction substantially parallel to the axis of said conduit and substantially perpendicular to the plane of said frame members, wherein said prong member is a separate member provided on at least a surface thereof with at least one one-way wedging and locking step for interlockingly engaging said corresponding wedging and locking recess on an interior surface of one of said sidewall members of said bifurcated lug member and on at least another surface thereof with at least a second one-way wedging and locking step for interlockingly engaging the corresponding wedging and locking recess on an interior surface of one of said sidewall members of said bifurcated lug member for interconnecting frame members each having said bifurcated member on the interconnected sides.

4. The conduit spacer assembly of claim 1 wherein said one-way wedging and locking step on the surface of said prong member comprises a first surface disposed at an acute angle relative to the longitudinal axis of said prong member and a second surface forming an outwardly projecting edge with said first surface and disposed substantially at right angle to the longitudinal axis of said prong member.

5. The conduit spacer assembly of claim 4 wherein said wedging and locking recess on an interior surface of one of said sidewall members of said bifurcated lug member comprises a first surface substantially parallel to the first surface defining the wedging step on the surface of said prong member and a second surface substantially at right angle to the longitudinal axis of said prong member axis such that said second surfaces abut one another when said said prong member is engaged within the sidewall member of said bifurcated lug member.

6. The conduit spacer assembly of claim 1 wherein the straight side opposite to said inwardly recessed side forms an enlarged planar base in a plane substantially parallel to the axis of said conduit.

7. The conduit spacer assembly of claim 6 further comprising at least one aperture in said planar base.

8. The conduit spacer assembly of claim 1 further comprising integral means on two remaining opposite sides of said frame member for releasably engaging a corresponding side of an adjacent similar frame member.

* * * * *